United States Patent
Liu

(10) Patent No.: US 8,438,354 B2
(45) Date of Patent: May 7, 2013

(54) ELECTRONIC DEVICE AND METHOD FOR PREVENTING DATA LOSS

(75) Inventor: Hua-Lin Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 167 days.

(21) Appl. No.: 13/191,468

(22) Filed: Jul. 27, 2011

(65) Prior Publication Data

US 2012/0324184 A1   Dec. 20, 2012

(30) Foreign Application Priority Data

Jun. 20, 2011   (CN) .......................... 2011 1 0165866

(51) Int. Cl.
*G06F 12/16*   (2006.01)

(52) U.S. Cl.
USPC .................................. 711/162; 711/E12.103

(58) Field of Classification Search .................. 711/162, 711/E12.103
See application file for complete search history.

(56) References Cited

U.S. PATENT DOCUMENTS

| | | | |
|---|---|---|---|
| 5,519,831 A * | 5/1996 | Holzhammer | 714/22 |
| 5,761,705 A * | 6/1998 | DeKoning et al. | 711/113 |
| 6,490,659 B1 * | 12/2002 | McKean et al. | 711/141 |
| 6,583,947 B1 * | 6/2003 | Hakamata et al. | 360/69 |
| 7,003,623 B2 * | 2/2006 | Teng | 711/104 |
| 7,529,950 B2 * | 5/2009 | Deguchi et al. | 713/300 |
| 7,610,445 B1 * | 10/2009 | Manus et al. | 711/113 |
| 2003/0189860 A1 * | 10/2003 | Takeuchi et al. | 365/200 |
| 2005/0013154 A1 * | 1/2005 | Honda et al. | 365/145 |
| 2006/0107010 A1 * | 5/2006 | Hirezaki et al. | 711/165 |
| 2008/0266698 A1 * | 10/2008 | Shibayama et al. | 360/69 |
| 2010/0174870 A1 * | 7/2010 | Banerjee | 711/143 |

* cited by examiner

*Primary Examiner* — Edward Dudek, Jr.
*Assistant Examiner* — John P Fishburn
(74) *Attorney, Agent, or Firm* — Altis Law Group, Inc.

(57) ABSTRACT

The electronic device and a preventing data loss method adapted for an electronic device are disclosed. The electronic device includes a storage unit to store an application. The method includes the steps: running an application in response to user input. Detecting the user input in real time and starting to time when the user input is not detected, and evaluating whether the period timed reaches a predetermined time period. If the predetermined time period is elapsed, suspending the application and detecting an electric energy of a battery providing power to the electronic device; evaluating whether the electric energy of the battery reaches a preset value. If the electric energy of the battery reaches the preset value, making a backup of process data associated with the suspended application in the storage unit.

6 Claims, 4 Drawing Sheets

ELECTRONIC DEVICE AND METHOD FOR PREVENTING DATA LOSS

BACKGROUND

1. Technical Field

The disclosure relates to electronic devices and, more particularly, to an electronic device for preventing data loss and a data loss prevention method adapted for the electronic device.

2. Description of Related Art

Many electronic devices, e.g., mobile phones, provide one or more game applications. While running the game application, the user of the mobile phone may stop playing and lock a keyboard of the mobile phone, but the mobile phone still runs the game application until the power of the mobile phone is exhausted. This wastes power and has the result that the user cannot restart playing the game from the point where the user stopped playing because of loss of process data.

Therefore, what is needed is an electronic device for preventing data loss to overcome the described shortcoming.

DETAILED DESCRIPTION

Figure 1:
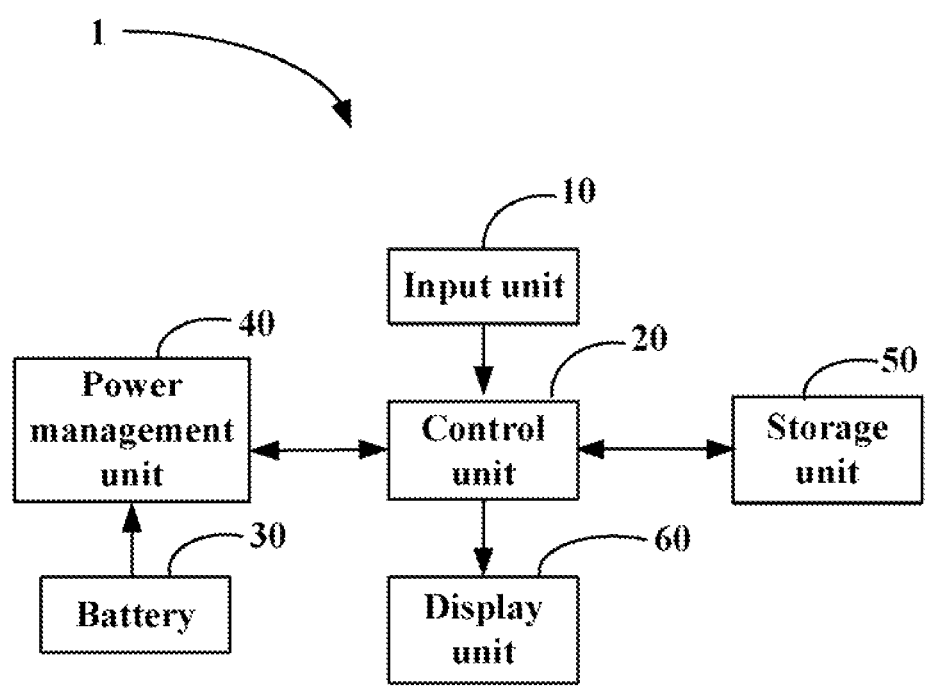
FIG. 1 is a block diagram of an electronic device for preventing data loss, in accordance with an exemplary embodiment.

FIG. 1 is a block diagram of an electronic device for preventing data loss, in accordance with an exemplary embodiment. The electronic device 1, such as a mobile phone, is loaded with many kinds of applications. The electronic device 1 includes an input unit 10, a control unit 20, a power management unit 40, a storage unit 50, and a display unit 60. The input unit 10 generates input signals in response to user input. The control unit 20 controls the electronic device 1. A battery 30 is defined to provide power to the electronic device 1. The power management unit 40 distributes the power from the battery 30 to all components. The storage unit 50 stores a number of applications, such as a game application. The display unit 60 displays information.

Figure 2:
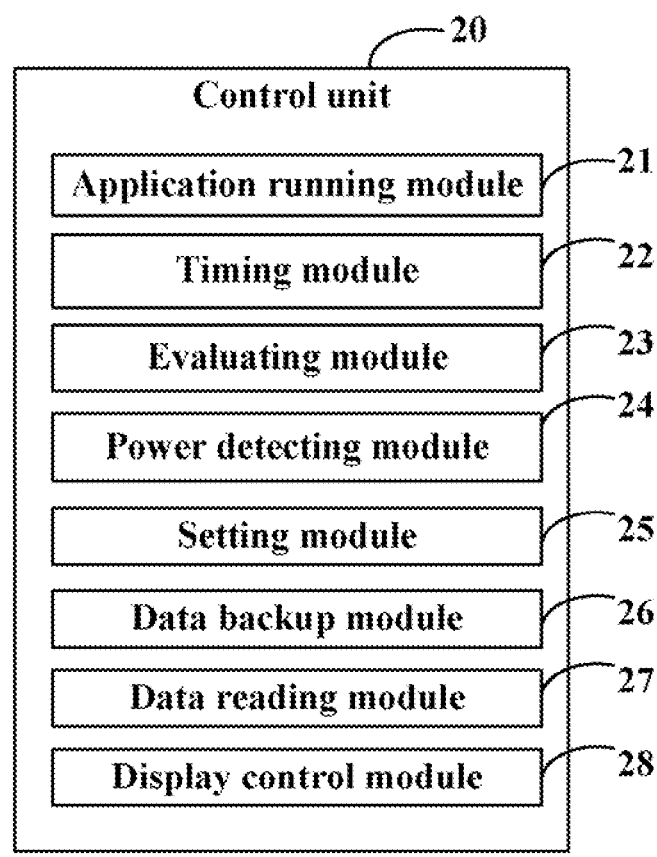
FIG. 2 is a block diagram of a control unit of the electronic device of FIG. 1, in accordance with an exemplary embodiment.

As shown in FIG. 2, the control unit 20 includes an application running module 21, a timing module 22, an evaluating module 23, a power detecting module 24, a setting module 25, a data backup module 26, a data reading module 27, and a display control module 28. The application running module 21 runs one application stored in the storage unit 50 in response to an input signal from the input unit 10, e.g., the game application.

During the running of the game application by the application running module 21, the timing module 22 detects the input signal from the input unit 10 in real time and starts to time when the input signal is not detected. The evaluating module 23 evaluates whether the period timed from the timing module 22 reaches a predetermined time period, such as five minutes. If the predetermined time period is elapsed, it means that the user has not played the game for five minutes then the application running module 21 suspends the application.

The power detecting module 24 detects an electric energy of the battery 30 when the period timed from the timing module 22 reaches the predetermined time period, and the evaluating module 23 evaluates whether the electric energy of the battery 30 reaches a preset value. When the electric energy of the battery 30 reaches the preset value, it means that the electric energy of the battery 30 will soon be exhausted, and the electronic device 1 will be turned off and process data associated with the suspended application will be lost when the electric energy of the battery 30 is exhausted.

The data backup module 26 makes a backup of the process data associated with the suspended application in the storage unit 50 when the electric energy of the battery 30 reaches the preset value and turns off the electronic device 1. In the embodiment, before making a backup of the process data, the setting module 25 sets an ID code for the process data associated with the suspended application and stores the process data with the ID code in the storage unit 50.

When the electronic device 1 receives another battery or is connected with a charger and is powered on again in response to user input from the input unit 10, the data reading module 27 reads the process data with the ID code from the storage unit 50. The display control module 28 controls the display unit 60 to display a user interface, which corresponds to the read process data from the data reading module 27. For example, if the data backup module 26 makes a backup of the process data in the second stage of the game application before the electronic device 1 is turned off, and when the electronic device 1 is powered on again after being charged, the display unit 60 displays the user interface which corresponds to the process data in the second stage of the game application. Therefore, the user can continue to play game from the time the application was suspended.

Figure 3:
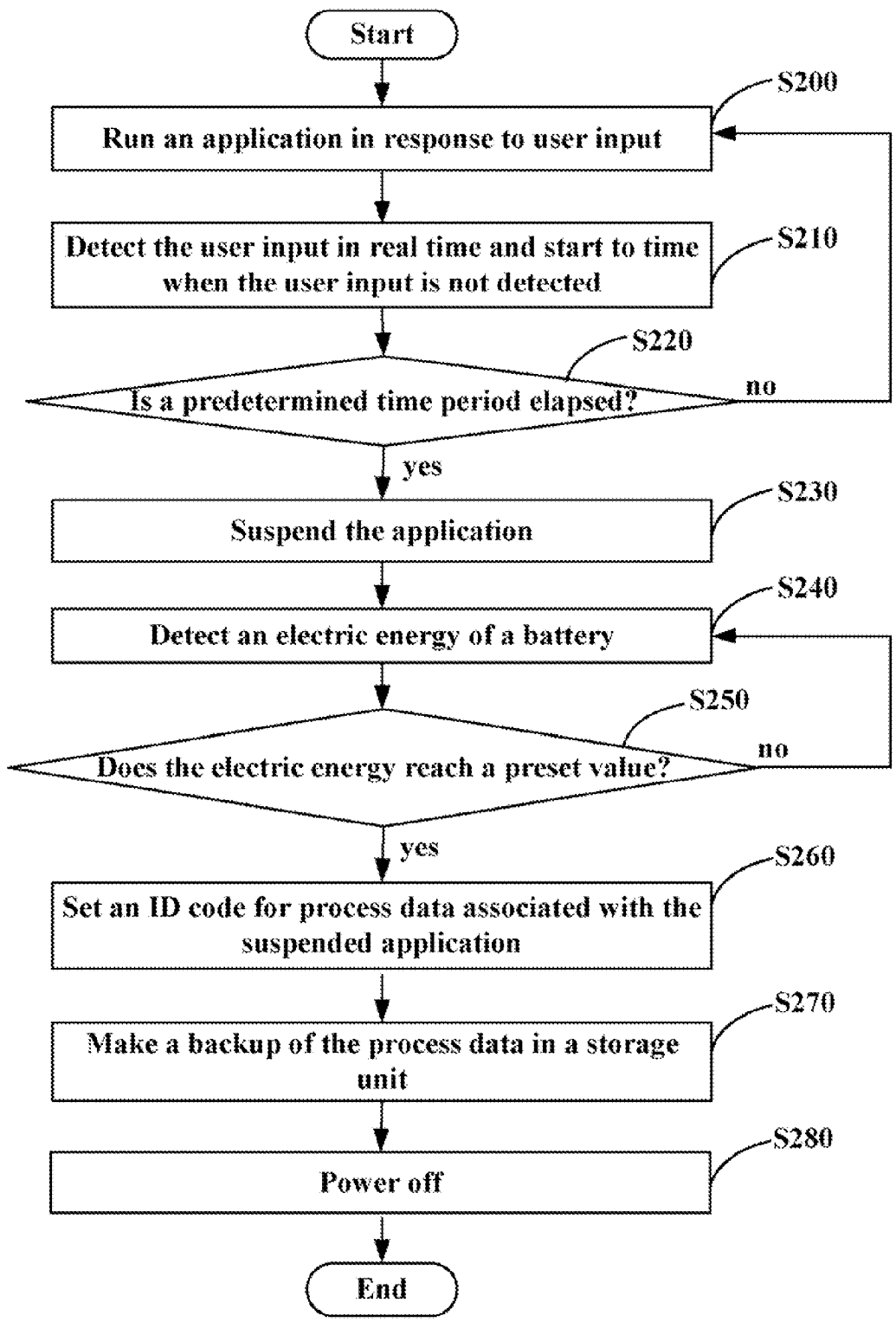
FIG. 3 is a flowchart of a data loss prevention method adapted for the electronic device of FIG. 1, in accordance with an exemplary embodiment.

FIG. 3 is a flowchart of a preventing data loss prevention method adapted for the electronic device of FIG. 1, in accordance with an exemplary embodiment. In step S200, the application running module 21 runs the application in the storage unit 50 in response to an input signal from the input unit 10. In step S210, the timing module 22 detects the input signal from the input unit 10 in real time and starts to time when no input signal is detected. In step S220, the evaluating module 23 evaluates whether the period timed from the timing module 22 reaches the predetermined time period. If the period timed does not reach the predetermined time period, the procedure goes back to the step S200.

If the predetermined time period is elapsed, in step S230, the application running module 21 suspends the application. In step S240, the power detecting module 24 detects the electric energy of the battery 30. In step S250, the evaluating module 23 evaluates whether the electric energy of the battery 30 reaches the preset value. If the electric energy of the battery 30 does not reach the preset value, the procedure goes back to the step S240. If the electric energy of the battery 30 reaches the preset value, in step S260, the setting module 25 sets the ID code for the process data associated with the suspended application. In step S270, the data backup module 26 makes a backup of the process data with the ID code associated with the suspended application in the storage unit 50. In step S280, the data backup module 26 turns off the electronic device 1.

Figure 4:
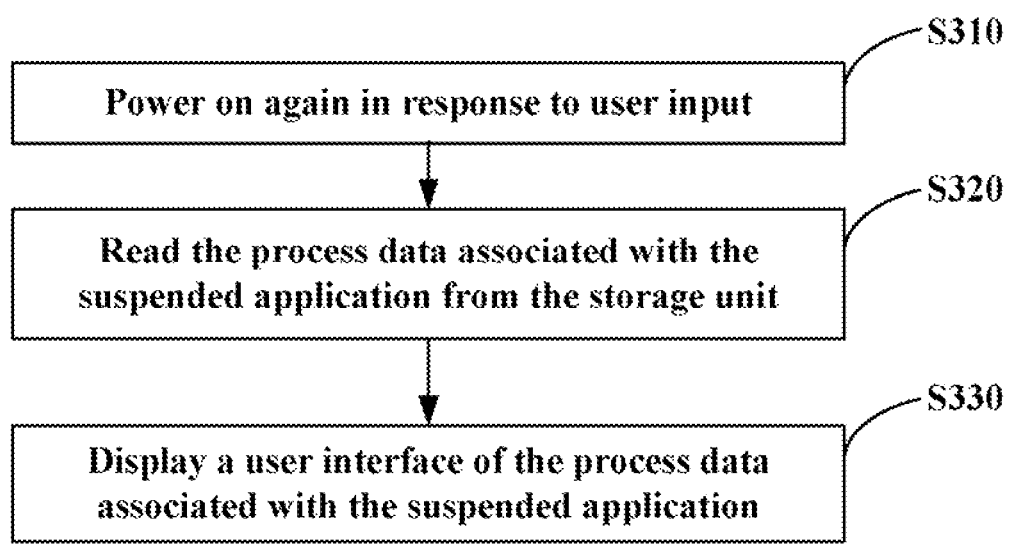
FIG. 4 is a flowchart of displaying process data method adapted for the electronic device of FIG. 1, in accordance with an exemplary embodiment.

FIG. 4 is a flowchart of displaying process data method adapted for the electronic device of FIG. 1, in accordance with an exemplary embodiment. In step S310, the electronic device 1 is powered on again in response to an input signal from the input unit 10. In step S320, the data reading module 27 reads the process data with the ID code associated with the suspended application from the storage unit 50. In step S330, the display control module 28 controls the display unit 60 to display the user interface corresponding to the read process data.

When the electronic device 1 runs the application, if the electronic device 1 does not receive any input signal from the input unit 10 for a predetermined time period, such as five minutes, the electronic device 1 makes a backup of the process data of the suspended application in the storage unit 50. Therefore, when the user goes back to utilize the electronic device 1, the electronic device 1 reads the process data of the suspended application from the storage unit 50 and continues to run the suspended application.

Although the present disclosure has been specifically described on the basis of the exemplary embodiment thereof, the disclosure is not to be construed as being limited thereto. Various changes or modifications may be made to the embodiment without departing from the scope and spirit of the disclosure.

The invention claimed is:

1. An electronic device comprising:
   an input unit to generate input signals in response to user input;
   a storage unit to store an application; and
   a control unit comprising:
      an application running module to run the application in the storage unit in response to an input signal from the input unit;
      a timing module to detect the input signal from the input unit in real time and starting to time when no input signal is detected;
      an evaluating module to evaluate whether the period timed from the timing module reaches a predetermined time period when the application is running, and when the predetermined time period is elapsed, the application running module further to suspend the application;
      a power detecting module to detect an electric energy of a battery providing power to the electronic device when the period timed from the timing module reaches the predetermined time period, and the evaluating module further to evaluate whether the electric energy of the battery reaches a preset value;
      a data backup module to make a backup of process data associated with the suspended application in the storage unit when the electric energy of the battery reaches the preset value, and
      a setting module to set an ID code for the process data associated with the suspended application before the data backup module makes a backup of the process data.

2. The electronic device as recited in claim 1, the control unit further comprising a data reading module to read the process data with the ID code from the storage unit after the electronic device is powered on again in response to user input from the input unit and a display control module to display a user interface which corresponds to the read process data.

3. The electronic device as recited in claim 1, the data backup module further to turn off the electronic device after making a backup of the process data associated with the suspended application.

4. A data loss prevention method adapted for an electronic device, the electronic device comprising a storage unit to store an application, the method comprising:
   running the application in response to user input;
   detecting the user input in real time and starting to time when the user input is not detected;
   evaluating whether the period timed reaches a predetermined time period;
   if the predetermined time period is elapsed, suspending the application and detecting an electric energy of a battery providing power to the electronic device;
   evaluating whether the electric energy of the battery reaches a preset value;
   if the electric energy of the battery reaches the preset value, making a backup of process data associated with the suspended application in the storage unit; and
   setting an ID code for the process data associated with the suspended application before the step of making a backup of process data associated with the suspended application in the storage unit.

5. The data loss prevention method as recited in claim 4, further comprising:
   turning on the electronic device again in response to user input;
   reading the process data with the ID code; and
   displaying a user interface which corresponds to the read process data.

6. The data loss prevention method as recited in claim 4, further comprising:
   turning off the electronic device after making a backup of the process data associated with the suspended application.

* * * * *